(12) United States Patent
Washburn, III et al.

(10) Patent No.: US 10,690,441 B2
(45) Date of Patent: Jun. 23, 2020

(54) MODULAR BUTTSTOCK INTERFACE CAP

(71) Applicant: Centre Firearms Co., Inc., Ridgewood, NY (US)

(72) Inventors: Richard Ryder Washburn, III, Ridgewood, NY (US); Michael Berkeypile, Ridgewood, NY (US)

(73) Assignee: CENTRE FIREARMS CO., INC., Ridgewood, NY (US)

( * ) Notice: Subject to any disclaimer, the term of this patent is extended or adjusted under 35 U.S.C. 154(b) by 0 days.

(21) Appl. No.: 16/192,104

(22) Filed: Nov. 15, 2018

(65) Prior Publication Data

US 2019/0285380 A1   Sep. 19, 2019

Related U.S. Application Data

(60) Provisional application No. 62/642,045, filed on Mar. 13, 2018.

(51) Int. Cl.
*F41C 23/20* (2006.01)
*F41A 11/02* (2006.01)
*B33Y 80/00* (2015.01)

(52) U.S. Cl.
CPC .............. *F41C 23/20* (2013.01); *F41A 11/02* (2013.01); *B33Y 80/00* (2014.12)

(58) Field of Classification Search
CPC .......... F41C 23/00; F41C 23/06; F41C 23/08; F41C 23/10; F41C 23/12; F41C 23/14; F41C 23/20; F41C 23/22
USPC ............... 42/71.01, 71.02, 72, 73, 74, 75.03
See application file for complete search history.

(56) References Cited

U.S. PATENT DOCUMENTS

| | | | |
|---|---|---|---|
| 8,869,444 B2 | 10/2014 | Bosco | |
| 2005/0215092 A1* | 9/2005 | Schoppman | F41A 11/04 439/101 |
| 2007/0089347 A1* | 4/2007 | Webber | F41A 11/02 42/75.03 |
| 2011/0271827 A1* | 11/2011 | Larson | F41A 5/28 89/193 |
| 2016/0018184 A1* | 1/2016 | Park | F41C 23/20 42/73 |
| 2017/0153084 A1* | 6/2017 | Tarazi | F41C 23/12 |
| 2017/0241737 A1* | 8/2017 | Keller, II | F41C 23/14 |

* cited by examiner

*Primary Examiner* — Bret Hayes
(74) *Attorney, Agent, or Firm* — Keating & Bennett, LLP (57) ABSTRACT

An end cap for a weapon can include a sub-frame, a body, and a rail. The end cap is a modular buttstock interface cap (MBIC) with a NATO STANAG 4694 or MIL-STD-1913 (Picatinny) rail interface that provides interchangeability between braces, stocks, and other accessories for weapon systems, including weapons with recoil buffer systems within the weapon's receiver. The MBIC can be a three-dimensional-printed structure.

18 Claims, 7 Drawing Sheets

MODULAR BUTTSTOCK INTERFACE CAP

RELATED APPLICATIONS

This application claims the benefit of U.S. Provisional Patent Application No. 62/642,045, filed Mar. 13, 2018, which is hereby incorporated by reference for all purposes as if fully set forth herein.

BACKGROUND

A modular weapon system will almost always include a rail system. Integrated rail systems enable fine-tuning of a firearm with modifications and variants including different types of optics, scopes, sights, lights, secondary weapons, grips, etc. A modern rail attachment system is typically incorporated into the frame of the weapon and provides flexibility for placement of the different components on the weapon. NATO STANAG 4694 and MIL-STD-1913 (i.e., Picatinny) document rail system standards that are used industry-wide. The Weaver rail is also a common interface system.

Common modular components used in configurable weapons include a brace and a gunstock. A brace is typically recognized as a device mounted to a pistol or short barrel handgun that helps improve aiming and support when shooting the firearm. A brace will typically fit over a recoil buffer used to reduce or cushion the impact to a shooter of recoiling parts of the gun. For example, a brace in U.S. Pat. No. 8,869,444 is described as engaging a shooter's forearm to secure a rearward end of the handgun frame. Optionally, a pistol brace can be designed to rest against a user's cheek, upper arm, or shoulder to provide stability.

A gunstock, stock, buttstock, or butt is attached to a firing mechanism of a long gun such as a rifle and is held against the user's shoulder when shooting the gun. The stock allows the shooter to firmly support the weapon and to easily aim the weapon with stability, and also transmits recoil into the shooter's body. A stock can include a front portion or fore-end attached to the receiver that relays recoil from the barrel. A butt portion of the stock typically rests against the shooter's shoulder to provide stability. Optionally, a shooter may rest their cheek against the stock to improve aiming and stability.

Stocks can be one-piece or two-piece designs. A one-piece stock is a single unit from butt to fore-end, such as that commonly found on a conventional bolt-action rifle. Two-piece stocks use separate pieces as the butt and fore-end, such as that commonly found on break-action shotguns, and lever-action rifles and shotguns. A stock can include a grip held by the shooter during firing and a comb that supports the shooter's cheek, which provides alignment when aiming and stability when firing. Buttstocks can be made to be rigidly fixed or foldable and can include adjustment features used to customize the geometry to fit an individual shooter's comfort or mission situation.

Figure 1:
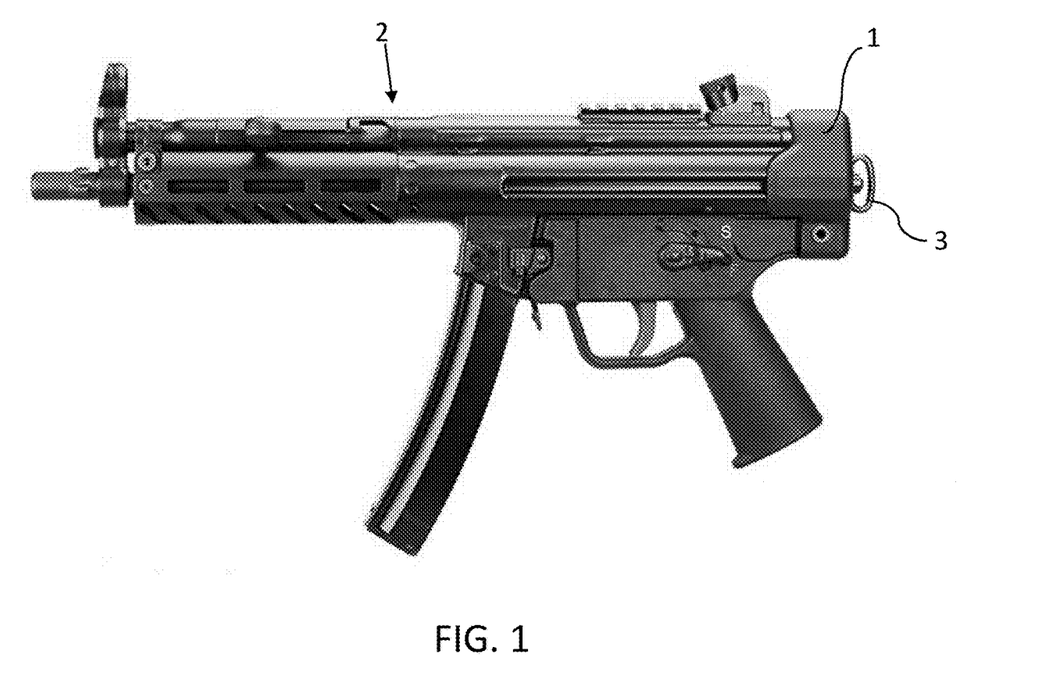
FIG. 1 shows a modularized weapon of the related art.

FIG. 1 shows a modularized weapon of the related art. As shown in FIG. 1, the weapon includes no brace or buttstock. Instead, the weapon of FIG. 1 includes an end cap 1 at the aft or proximal end of the weapon 2. As shown, the end cap 1 seals the end of the weapon 2, retains the rear portion of the recoil buffer mechanism, and includes a swivel adapter 3 that provides a sling attachment location. In this design, the weapon would need to be broken down (disassembled), and the end cap 1 removed, before replacing the end cap 1 with a brace or one-piece buttstock. This operation takes time and would be difficult to perform in the field. Additionally, as there is no standard interface at the rear of such weapons, each brace or buttstock must be specifically designed to mate with each corresponding modular weapon platform.

SUMMARY OF THE INVENTION

To overcome the problems described above, preferred embodiments of the present invention provide an end cap as a modular buttstock interface cap including a recognized standard interface in which a brace, buttstock, or other accessory can be mounted.

Additionally, preferred embodiments of the present invention provide a user with the ability to rapidly change the rear of the weapon or stock configurations.

Additionally, preferred embodiments of the present invention provide a user with the ability to convert the weapon from a pistol to a rifle without rendering the weapon inoperable during the conversion.

Additionally, preferred embodiments of the present invention provide an internationally established standard interface that can be used to attach buttstocks and other accessories.

Additionally, preferred embodiments of the present invention provide a user with the ability to index their cheek position up and down on the buttstock.

A modular buttstock interface cap used with a weapon includes a body and a rail attached to the body.

A modular buttstock interface cap can include a sub-frame.

A modular buttstock interface cap can include a socket configured to attach and detach weapon components.

The rail can be compatible with an interface defined in NATO STANAG 4694.

The modular buttstock interface cap can include no joints, no seams, or any formerly separate pieces within the body, the rail, and the sub-frame.

A weapon can include the modular buttstock interface cap. A weapon including the modular buttstock interface cap can also include a buttstock attached to the modular buttstock interface cap.

A weapon including the modular buttstock interface cap can also include a rail that is vertically oriented with respect to the weapon.

The modular buttstock interface cap can be a three-dimensional-printed structure.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention integrate a rail system with an end cap to be used with a weapon, into a modular buttstock interface cap as shown in the drawings. As described below, the modular buttstock interface cap (MBIC) can be located at a suitable position on a weapon to provide access to the rail that provides an attachment interface for a brace, buttstock, sling, or any other suitable accessory. As one of ordinary skill in the art will appreciate, the MBIC can be used with any suitable weapon including, but not limited to, an air gun, pistol, rifle, shotgun, machine gun, cross-bow, Taser, laser, or other small arms.

In contrast to known end caps, the MBICs of preferred embodiments of the present invention provide a user the ability to rapidly change accessories mounted to a rail on the MBIC. In particular, the user can rapidly change the stock configurations of weapon systems with buffer systems contained within their receivers such as the MPS, G3, G36, MPX, AK-47, their clones, and the like, as well as others, without removing or replacing the weapon's end cap. Optionally, the MBIC can be used with weapon systems with buffer systems not retained by the end cap or buttstock such as G36, MP7, AK family, and the like.

In addition, the MBICs of preferred embodiments of the present invention provide the user with the ability to convert a weapon from a hand-held pistol to a shoulder-supported rifle without rendering the weapon inoperable during the changeover process because the end cap that captures and retains the weapon assemblies that operate the action and recoil is never removed during the conversion.

The rail system attached to the MBIC provides an internationally established interface that can be used with buttstocks and accessories to be designed around. Well known rail systems, for example, include those compatible with STANAG 4694, MIL-STD-913 (i.e., Picatinny), Weaver, M-LOK, KeyMOD, and P-CAP standard mounting interfaces.

A vertical orientation of the rail on the MBIC provides the user with the ability to index a buttstock up and down in standard increments, for example, 10 mm, to a desired firing position. This can be achieved by releasing the rail grabber interface on the buttstock and by moving the buttstock to another suitable recoil lug position on the rail.

It is further possible to integrate a "Quick Detach" (QD) socket of a mechanism used to attach detach weapon accessories or components exposed into the MBIC, for example, under the rail. With the rail removed, the QD socket is exposed, and the MBIC and weapon profile is reduced. Optionally, a clip that can be used with a sling or other accessory with a QD interface can then be quickly attached or detached.

Figure 2:
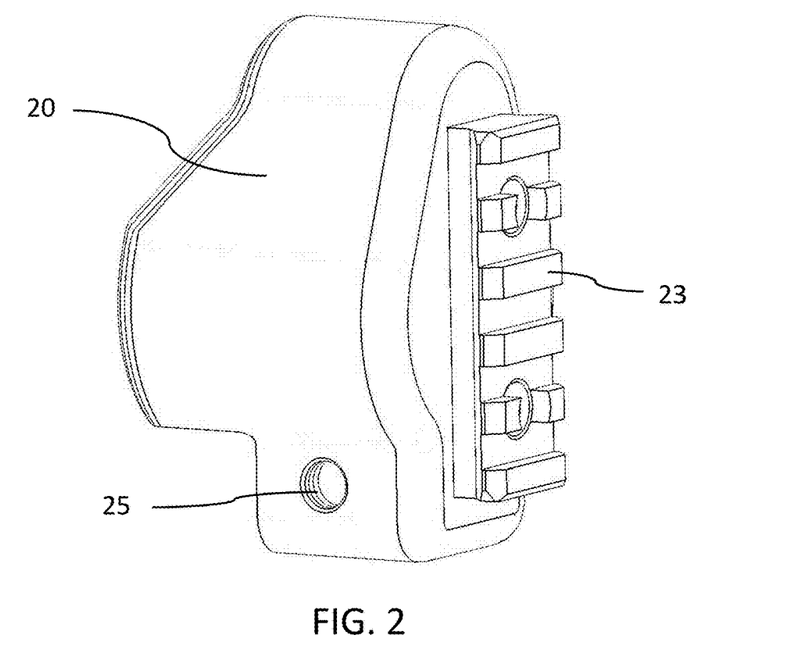
FIG. 2 is a perspective view of a modular buttstock interface cap according to a preferred embodiment of the present invention.

FIGS. 2-9 show various exemplary views of preferred embodiments of the present invention. As shown in FIG. 2, an MBIC according to a preferred embodiment of the present invention can include a body 20, a rail 23, and a mounting hole 25 in the body 20. Optionally, an MBIC according to a preferred embodiment of the present invention can include multiple mounting holes used to mount and to secure the MBIC to a weapon.

Figure 3:
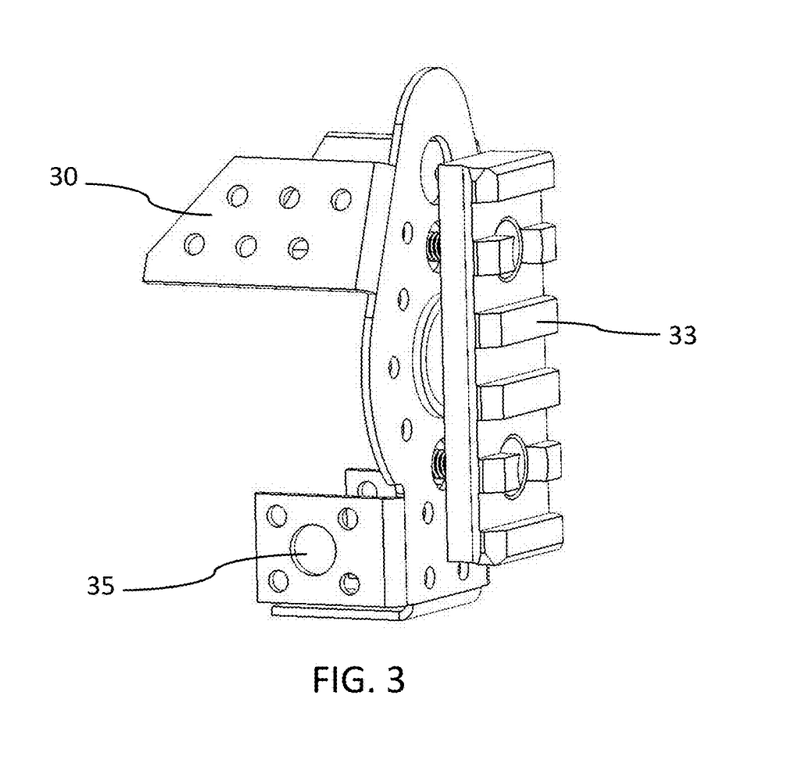
FIG. 3 is a perspective view of the modular buttstock interface cap of FIG. 2 with a body removed according to a preferred embodiment of the present invention.

FIG. 3 is a perspective view of the modular buttstock interface cap of FIG. 2 with the body removed according to a preferred embodiment of the present invention. FIG. 3 shows an MBIC according to a preferred embodiment of the present invention including a sub-frame 30, a rail 33, and a mounting hole 35 in the sub-frame 30.

Figure 4:
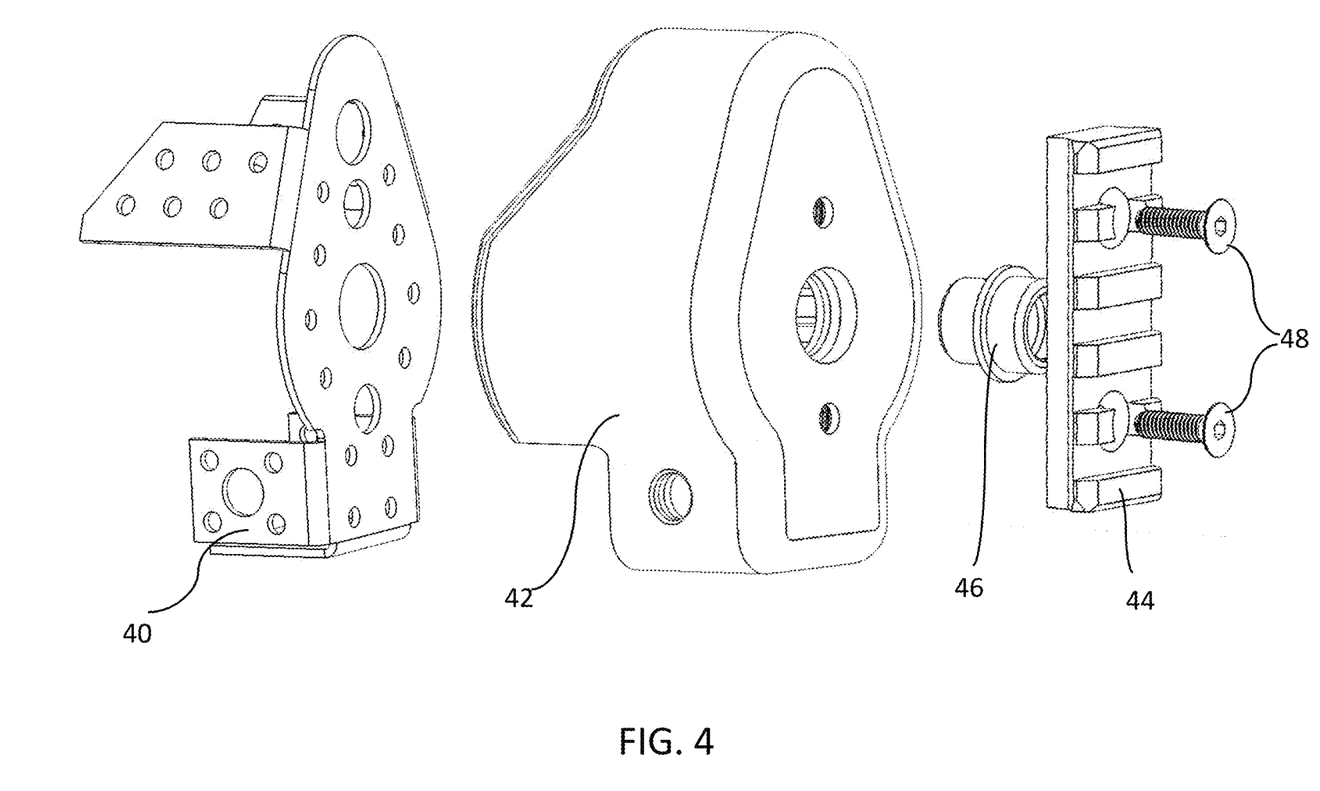
FIG. 4 is an exploded view of a modular buttstock interface cap according to a preferred embodiment of the present invention.

FIG. 4 shows an exploded view of the MBIC. As shown in FIG. 4, the MBIC can include a sub-frame 40, a body 42, a rail 44, a QD socket 46 under the rail 44, and fasteners 48 to mount the rail to the body 42.

Figure 5:
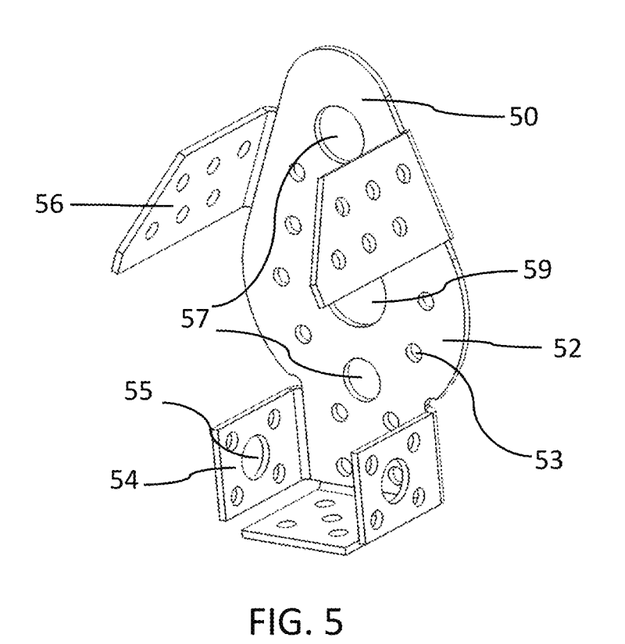
FIG. 5 is a perspective view of a sub-frame according to a preferred embodiment of the present invention.

FIG. 5 is a perspective view of a sub-frame 50 according to a preferred embodiment of the present invention. The MBIC can include a structure of the sub-frame 50 to provide rigidity and support when mounted to the weapon and that can be used to attach the rail. The sub-frame 50 can be used to mount a buffer pad (not shown), as well as an external mechanism of a QD socket under the rail that is configured to allow the user to quickly attach/detach a sling swivel or other accessory. The sub-frame 50 additionally reinforces the MBIC mounting hardware, such as a push pin, preventing the MBIC from becoming separated from the weapon.

As shown in FIG. 5, the sub-frame 50 can be a single structure including a substantially flat plate 52, with three lower tabs 54 forming a U-shape and two upper tabs 56 that are all bent in the same direction perpendicular to the body 52. The sub-frame 50 shown in FIG. 5 includes a series of holes 53 that increases surface area for an over molded body to attach to during fabrication and that decreases weight. The sub-frame 50 shown in FIG. 5 also includes two through holes 55 to allow a push pin or fastener to pass through the lower tabs 54 and to retain the MBIC to a weapon. The sub-frame 50 also includes through two holes 57 in the plate 52 to allow a fastener to pass through and retain the rail to the MBIC as shown in FIG. 4. The sub-frame 50 also includes a through hole 59 in the plate 52 to allow a QD socket to be retained under the rail as shown in FIG. 4. Optionally, one or more of the through holes 55, 57, and 59 can include grooves such as threads or a bayonet mount to accept a corresponding fastener.

The sub-frame 50 can include features such as threads or a counter bore to accept hardware to mount the rail or to mount the MBIC to a weapon. Optionally, the sub-frame 50 can also include features used to attach and retain the MBIC to a weapon including a tab, a flange, a locking mechanism, or the like (not shown).

The sub-frame 50 can be one piece or multiple pieces. The sub-frame 50 can be made of metal, alloy, ceramic, plastic, composite, glass fiber, combinations thereof, or any other suitable material. Metals that may be used to form the sub-frame 50 include aluminum, titanium, Inconel, steel, or any other alloy. The sub-frame 50 can be formed by stamping, casting, molding, machining, 3D printing, or any other suitable process. Optionally, the sub-frame 50 can be omitted or can be integrally formed so that the MBIC includes no joints, no seams, or any formerly separate pieces within the body and the sub-frame 50.

Figure 6:
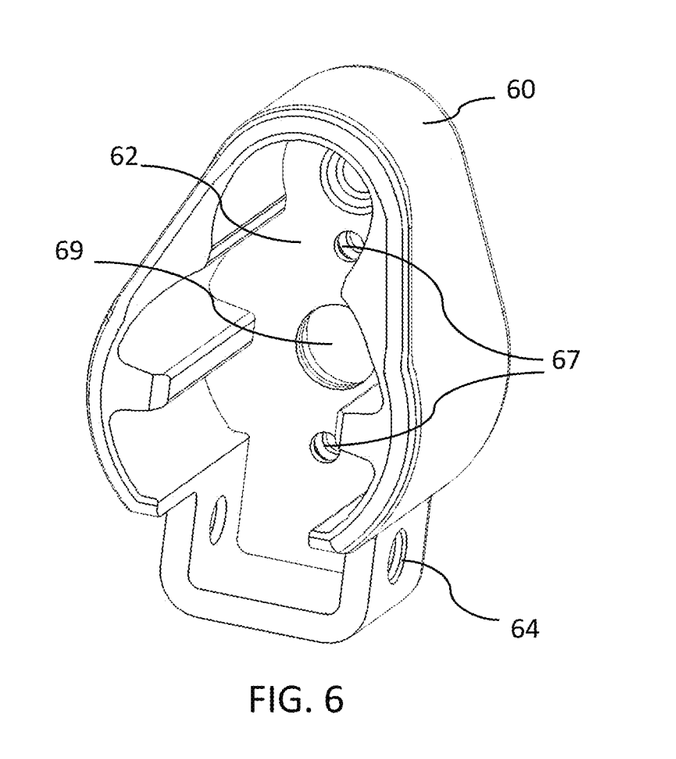
FIG. 6 is a perspective view of a body according to a preferred embodiment of the present invention.

FIG. 6 is a perspective view of a body 60 of the MBIC according to a preferred embodiment of the present invention. The body 60 can encapsulate and protect the sub-frame structure. The body 60 can provide an aesthetically-pleasing appearance that can be matched to the weapon finish or exterior and that can provide a buffer between the sub-frame and the environment. The body 60 can be over-molded to the sub-frame with a glass fiber reinforced polymer, metal, rubber, plastic, or other suitable material. Optionally, as mentioned above, the body 60 can be integrally fabricated with the sub-frame or support structure so that there are no joints, no seams, or any formerly separate pieces within the body 60 and the sub-frame.

FIG. 6 shows that the body 60 can be shaped to include a hollow or recessed portion used to fit over the end of the corresponding weapon. This shape of the body 60 also provides space to locate a buffer and the QD mechanism. The body 60 in FIG. 6 can include an internal flat portion 62 that includes through holes 67 used to mount the rail and a through hole 69 for the QD mechanism. A U-shaped portion at the bottom of the body 60 can include two through holes 64 used to mount the MBIC to the weapon. As also shown in FIG. 6, the outer shape of the end cap is substantially rounded to aesthetically and functionally match the profile of the corresponding weapon to which it is mounted. Optionally, one or more of the through holes 64, 67, and 69 can include grooves such as threads or a bayonet mount to accept a corresponding fastener.

Figure 7:
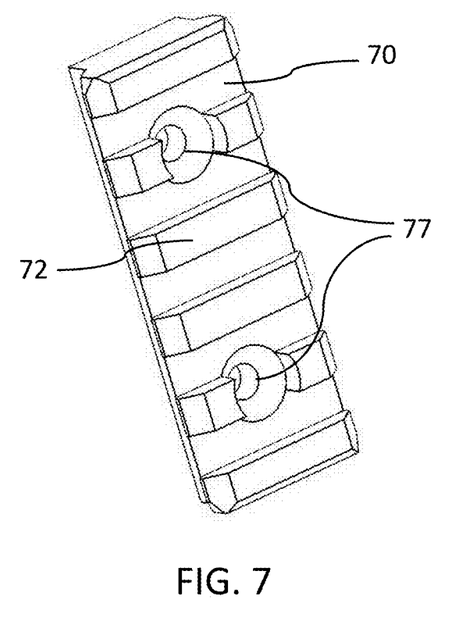
FIG. 7 is a perspective view of a rail according to a preferred embodiment of the present invention.

FIG. 7 is a perspective view of a rail 70 of the MBIC according to a preferred embodiment of the present invention. As shown in FIG. 7, the rail 70 can be substantially rectangular shaped with a substantially flat rear surface and can include one or more mounting features 72, ribs, or dovetails used to attach an accessory to the rail 70 and through holes 77 used to mount the rail 70 to the body and sub-frame. The rail 70 can be fastened to the body/sub-frame using screws, bolts, rivets, adhesive, or any other suitable method and the through holes 77 can include a counter bore or counter sink to mate with a suitable fastener. The rail 70 can be removable from the body/sub-frame to replace a damaged rail, to replace with a different rail system, to reorient the rail 70, or can be excluded. Removing the rail 70 can provide access to a QD mechanism that can be covered, hidden, and protected by the rail 70. When mounted, preferably the long direction of the rail 70 is oriented vertically with respect to the orientation of the weapon to which it is mounted, but is not limited thereto.

The rail 70 can be made from metal, an alloy, ceramic, composite, plastic, or any suitable material by machining, casting, molding, 3D printing, or any suitable process. Optionally, the rail 70 can be finished by anodizing, powder coating, plating, painting, with any other suitable material and compatible method. In a preferred embodiment of the present invention, the rail 70 preferably is made of 7075 T6 aluminum and coated with a black MIL-A-8625 Type III hard coat anodization. In a preferred embodiment of the present invention, the rail 70 is mounted to the end cap with two self-retaining, black oxide coated, alloy steel flat headed socket cap screws. Optionally, a locking compound can be placed on the screw threads to prevent the screws from inadvertently backing out of the MBIC. Optionally, the rail 70 can be integrally fabricated with the body and/or sub-frame of the MBIC so there are no joints, no seams, or formerly separate pieces within the sub-frame, the body, and the rail 70.

In accordance with the present exemplary embodiment of the present invention, the MBIC as illustrated in FIG. 2 can be manufactured as a single monolithic unit using three-dimensional (3-D) printing techniques as previously described. The MBIC can be made from plastic, metal, alloys, fiber, composite materials, or combinations thereof using a 3-D printing process. Optionally, a portion or portions of the MBIC can be fabricated using 3-D printing and the remaining portions fabricated using other techniques. Further, the resulting MBIC can be subject to secondary processing to subtract material to form features such as the mounting holes 25.

Figure 8:
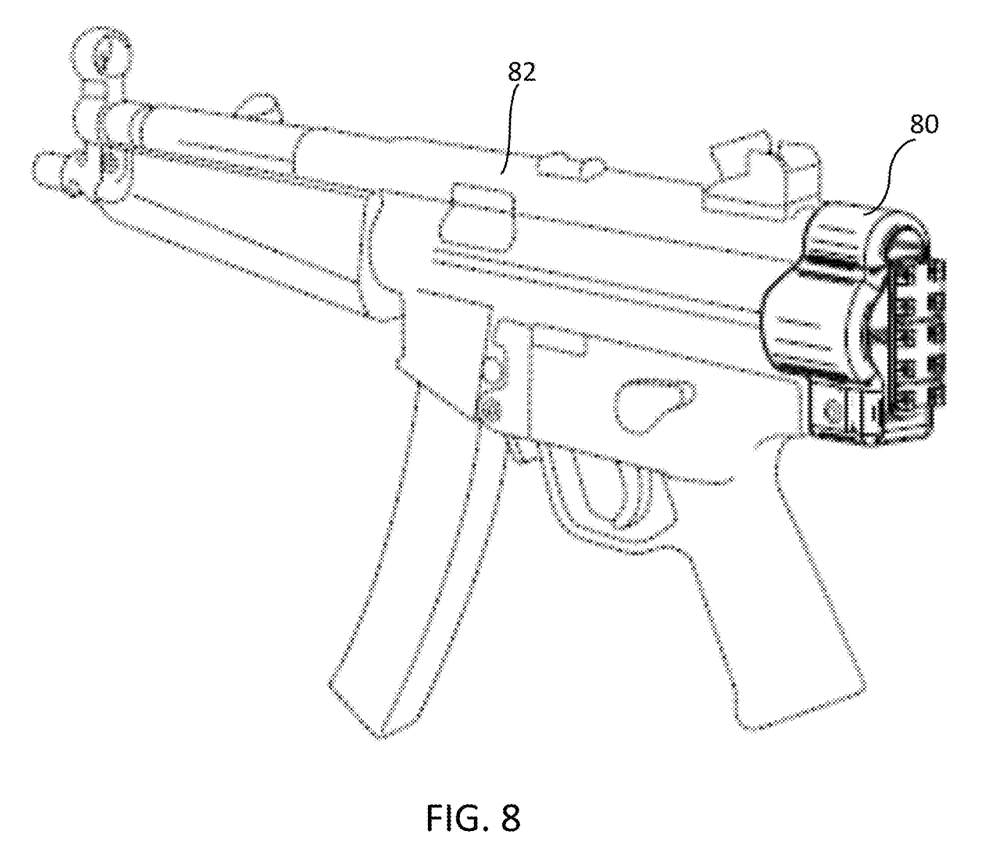
FIG. 8 is a front and left perspective view of the endcap in an exemplary position on a weapon.
Figure 9:
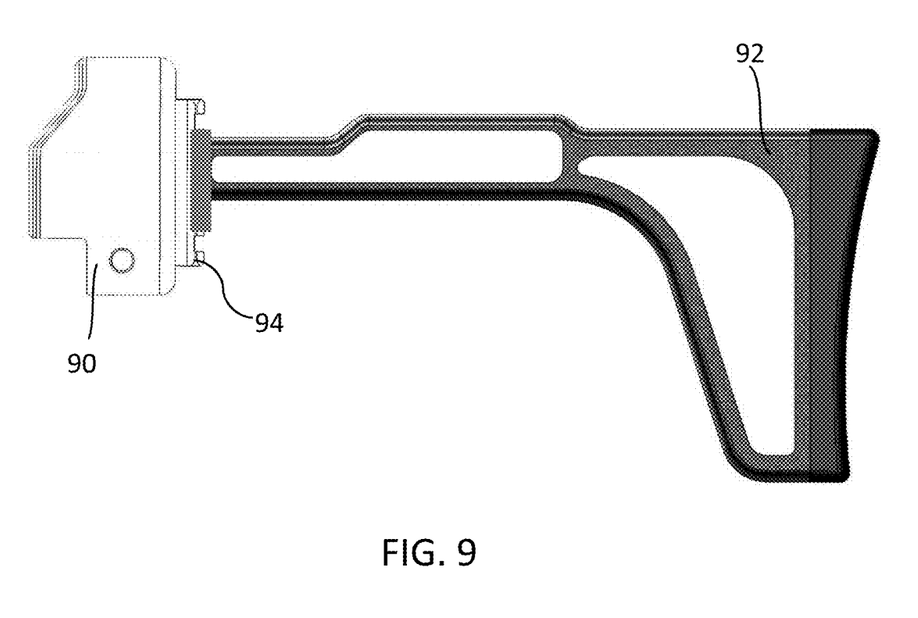
FIG. 9 is a side view of a modular buttstock interface cap with an exemplary buttstock.

FIG. 8 is a front and left perspective view of a MBIC 80 according to a preferred embodiment of the present invention in an exemplary position on a weapon 82. FIG. 9 is a side view of a MBIC 90 according to a preferred embodiment of the present invention with an exemplary buttstock 92 attached to a rail 94 of the MBIC 90.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A modular buttstock interface cap for use with a weapon, the modular buttstock interface cap comprising:
    a sub-frame;
    a body entirely surrounding the sub-frame; and
    a rail attached to the body, wherein
    a portion of the sub-frame is configured to fit over a portion of the weapon.

2. The modular buttstock interface cap of claim 1, further comprising:
    a socket configured to attach and detach weapon components.

3. The modular buttstock interface cap of claim 1, wherein the rail is compatible with an interface defined in NATO STANAG 4694.

4. The modular buttstock interface cap of claim 1, wherein the modular buttstock interface cap is a one-piece three-dimensional-printed structure.

5. The modular buttstock interface cap of claim 4, further comprising a mounting hole on a side of the body, in which an axis of the mounting hole is in a direction substantially perpendicular to a longitudinal axis of a barrel of the weapon, and used to mount the modular buttstock interface cap to the weapon.

6. A weapon including the modular buttstock interface cap of claim 1.

7. The weapon of claim 6, wherein the rail is vertically oriented with respect to the weapon.

8. The modular buttstock interface cap of claim 1, wherein the portion of the weapon is a receiver.

9. The modular buttstock interface cap of claim 1, wherein the body is over-molded to the sub-frame.

10. A modular buttstock interface cap for use with a weapon, the modular buttstock interface cap comprising:
    a sub-frame;
    a body; and
    a rail, wherein
    the modular buttstock interface cap is one-piece and includes no joints, no seams, or any formerly separate pieces within the body, the rail, and the sub-frame, and
    the body includes a cavity to surround a portion of the weapon.

11. The modular buttstock interface cap of claim 10, wherein the modular buttstock interface cap is a three-dimensional-printed structure.

12. The modular buttstock interface cap of claim 11, further comprising a mounting hole on a side of the body, in which an axis of the mounting hole is in a direction substantially perpendicular to a longitudinal axis of a barrel of the weapon, and used to mount the modular buttstock interface cap to the weapon.

13. The modular buttstock interface cap of claim 10, wherein the portion of the weapon is a receiver.

14. A weapon including a modular buttstock interface cap, wherein
   the modular buttstock interface cap includes:
   a sub-frame;
   a body; and
   a rail, and
   the modular buttstock interface cap is one-piece and includes no joints, no seams, or any formerly separate pieces within the body, the rail, and the sub-frame, and
   the body includes a cavity that surrounds a portion of the weapon.

15. The weapon of claim 14, further comprising a buttstock attached to the modular buttstock interface cap.

16. The weapon of claim 14, wherein the modular buttstock interface cap is a three-dimensional-printed structure.

17. The weapon of claim 14, wherein the portion of the weapon is a receiver.

18. The weapon of claim 14, further comprising a mounting hole on a side of the body, in which an axis of the mounting hole is in a direction substantially perpendicular to a longitudinal axis of a barrel of the weapon, and used to mount the modular buttstock interface cap to the weapon.

\* \* \* \* \*